(12) United States Patent
Enders

(10) Patent No.: US 9,394,005 B1
(45) Date of Patent: Jul. 19, 2016

(54) FOOT WELL INTRUSION DEFLECTION SYSTEMS AND RELATED METHODS AND APPARATUS

(71) Applicant: Autoliv ASP, Inc., Ogden, UT (US)

(72) Inventor: Mark L. Enders, Pleasant View, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/621,254

(22) Filed: Feb. 12, 2015

(51) Int. Cl.
- *B60J 9/00* (2006.01)
- *B62D 21/15* (2006.01)
- *B62D 25/08* (2006.01)

(52) U.S. Cl.
CPC ............. *B62D 21/155* (2013.01); *B62D 25/08* (2013.01)

(58) Field of Classification Search
CPC .............................. B62D 21/155; B62D 25/08
See application file for complete search history.

(56) References Cited

U.S. PATENT DOCUMENTS

| 6,848,715 | B2 | 2/2005 | Nelson et al. | |
|---|---|---|---|---|
| 8,002,312 | B2 | 8/2011 | Korechika et al. | |
| 2009/0152901 | A1 * | 6/2009 | Takeuchi | B62D 25/161 296/203.01 |

FOREIGN PATENT DOCUMENTS

| DE | 4302240 | 8/1993 |
|---|---|---|
| DE | 4326668 | 2/1995 |
| DE | 10154026 | 5/2003 |
| EP | 0757634 | 12/1998 |
| EP | 0978442 | 2/2000 |
| EP | 0980815 | 2/2000 |
| FR | 2654689 | 5/1991 |
| WO | WO2004071851 | 8/2004 |
| WO | WO2012007726 | 1/2012 |
| WO | WO2014015094 | 1/2014 |

OTHER PUBLICATIONS

Concise Explanation of Relevance of DE10154026.
Concise Explanation of Relevance of FR2654689.
Concise Explanation of Relevance of EP0978442.
Concise Explanation of Relevance of DE4326668.
Concise Explanation of Relevance of DE4302240.
Concise Explanation of Relevance of EP0980815.

* cited by examiner

*Primary Examiner* — Lori L Lyjak
(74) *Attorney, Agent, or Firm* — Phillips Ryther & Winchester; Matthew D. Thayne

(57) ABSTRACT

Apparatus, methods, and systems for deflecting a vehicle wheel away from a foot well to reduce the chances for intrusion into the foot well during certain collisions, such as foot well intruding impact events. In some embodiments, the system may comprise an expandable structure comprising a rigid material. The expandable structure may be configured to be positioned in a wheel well of a vehicle and may be configured to actuate from a first, contracted configuration to a second, expanded configuration, and to deflect a vehicle wheel away from a foot well of the vehicle during an impact event to reduce the chances of the vehicle wheel entering the foot well during the impact event. The system may further comprise an inflator configured to deliver a fluid to the expandable structure during actuation so as to expand the expandable structure from the first configuration to the second configuration.

23 Claims, 7 Drawing Sheets

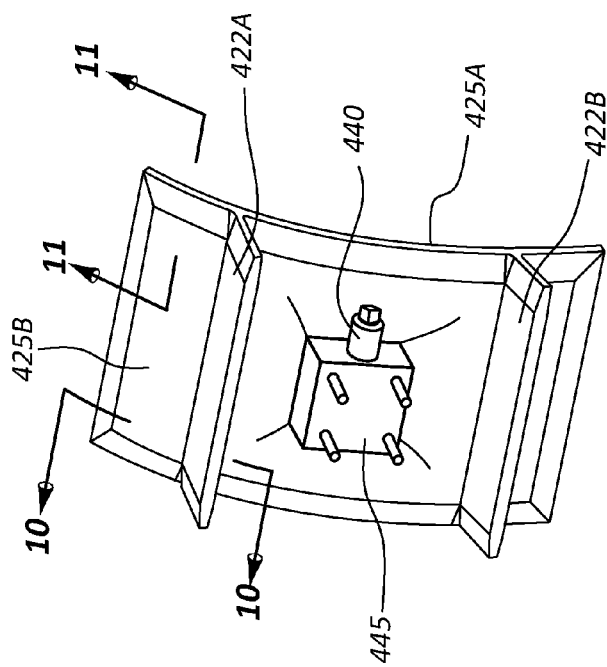
FIG. 11
FIG. 9
FIG. 10

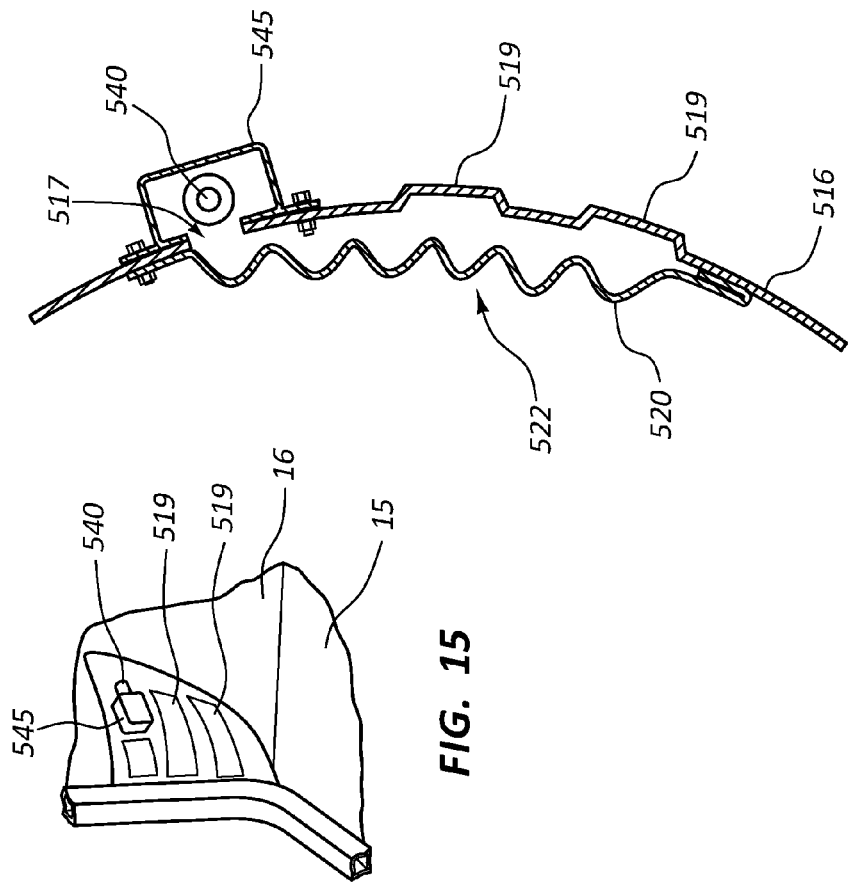
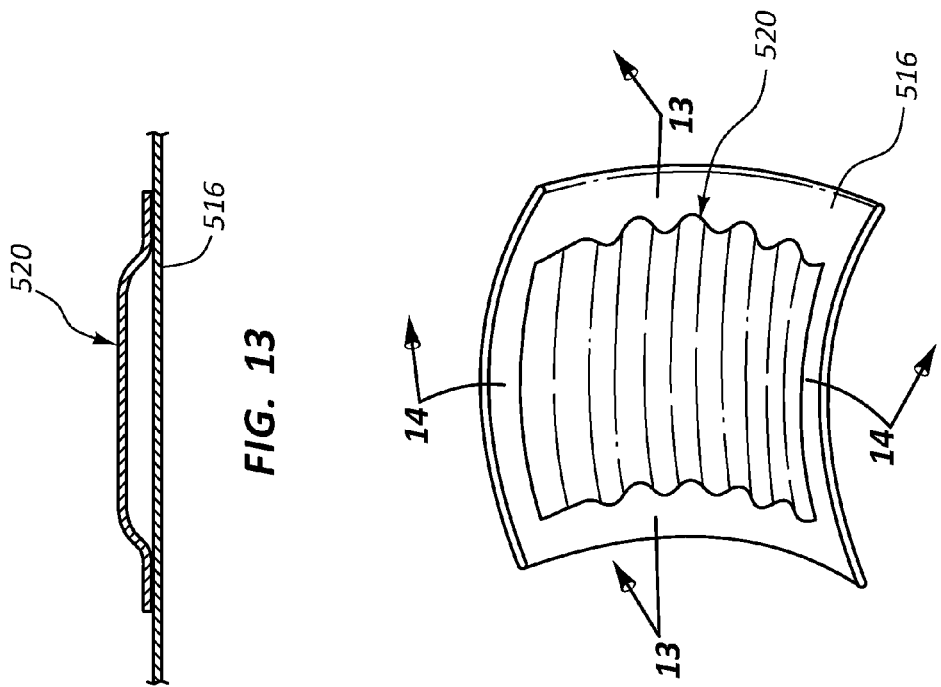

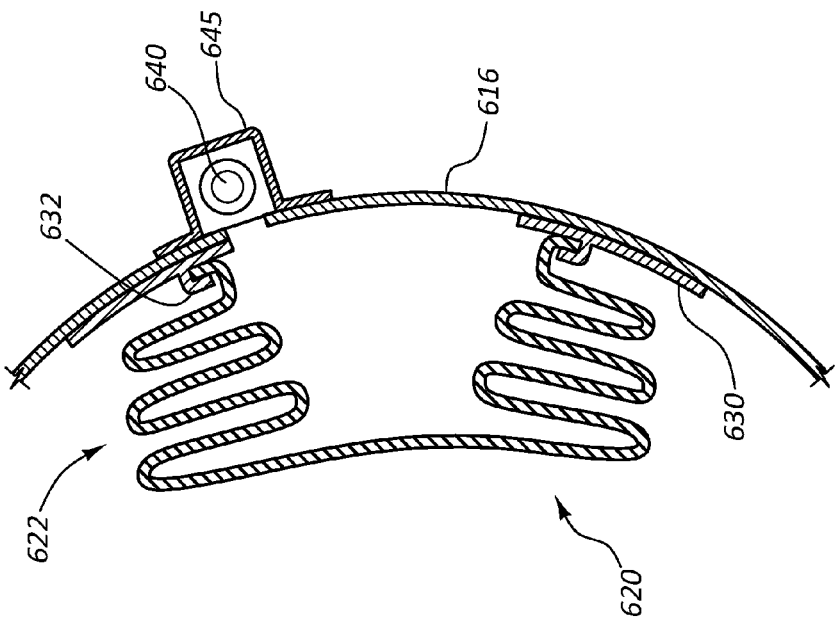
FIG. 17
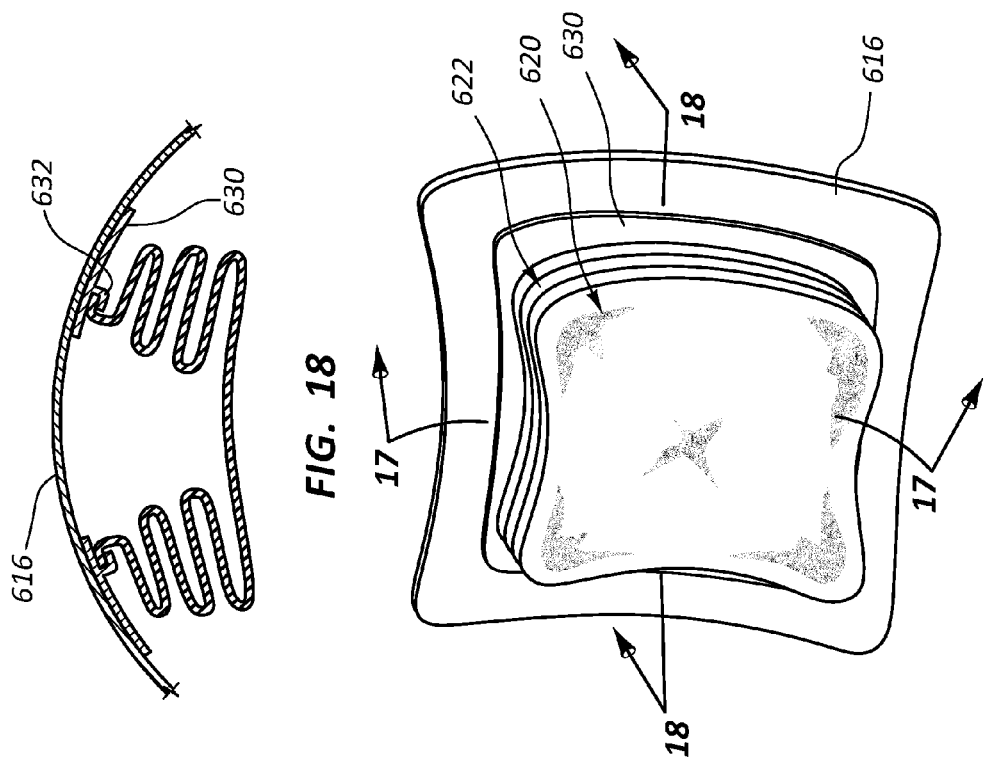
FIG. 18
FIG. 16

FOOT WELL INTRUSION DEFLECTION SYSTEMS AND RELATED METHODS AND APPARATUS

SUMMARY

Apparatus, methods, and systems are disclosed herein for deflection of a vehicle wheel during or just prior to an impact event, such as an impact event that results in, or is likely to result in, intrusion into a foot well of the vehicle.

There are many problems associated with a vehicle impact categorized by the Insurance Institute for Highway Safety (IIHS) as a "small overlap" (SO) crash condition. The IIHS SO test simulates an impact of the vehicle solely, or primarily, along a portion of a vehicle in front of one of the vehicle's front tires. Vehicles are typically not well suited to absorb these impacts, since they typically do not impact the longitudinal members of the vehicle structure. These impacts are therefore typically absorbed by the fender and/or front wheel where there is little or no designed vehicle structure to absorb the impact. Consequently, the vehicle's wheel, wheel well, and/or door frame often intrude into the occupant's space within the foot well of the vehicle.

Vehicle accident fatalities are often caused by these small overlap, oblique, and collinear type crashes. In these types of crashes, the principal direction of force is typically outside of the vehicle's longitudinal members. These longitudinal structures are primarily designed to absorb crash energy in direct frontal crash scenarios. When the accident is a small overlap (SO) with 25% overlap, oblique or collinear impact, the main portion of the vehicle which contacts the barrier or other vehicle may be outside of the longitudinal structure. The wheel may be the main contact point to the barrier or other vehicle in these scenarios. As such, wheel intrusion into the vehicle may result, which may cause lower leg injuries.

The present inventors have therefore determined that it would be desirable to provide systems and methods that overcome one or more of the limitations of the prior art. For example, the present inventors have determined that, by implementing one or more of the inventive concepts, embodiments, and/or implementations disclosed herein, leg injuries may be reduced during SO crash conditions and/or crash conditions similar to SO crash conditions (in which most or all of the impact is received on one or both sides of the front of a vehicle adjacent to the foot well). These improvements may be provided by providing a system for deflecting the vehicle wheel or wheels and/or other structures in or adjacent to one or both of the vehicle's front wheel wells so as to reduce the possibility of intrusion into the occupant's foot well.

In some embodiments, the system may comprise an expandable structure, such as an inflatable structure, which may be located in or near the wheel well of the vehicle. During a crash, the expandable structure may inflate or otherwise expand to provide increased stiffness in this area of the vehicle and/or to fill the gap between the wheel and frame. Preferably, the expandable structure comprises a stiff, non-flexible structure so as to provide sufficient deflecting force to deflect an intruding wheel away from the occupant's cabin area. Preferably, the device deflects at least the wheel itself, which is often the main cause of vehicle intrusion and resulting injuries.

Most wheel well structures lack small mounting holes in this area so as to prevent debris and moisture from the wheel from entering the occupant's space. Moreover, there is often quite a bit of room in the region between the wheel and the wheel well. Thus, this region in the wheel well may be ideal for coupling certain embodiments of expandable structures described herein. Many vehicles also have a plastic shroud between the wheel and the body for improved cosmetic appearance and to contain the wheel/road debris. There is often a gap between the shroud, the joint flange of the vehicle (where the hinge pillar structure is welded to the wheel well), and wheel well. Thus, some embodiments may be installed in this gap by bolting, welding, or otherwise coupling it within this gap region.

In some embodiments, the outer profile of the structure may be about 500×500 mm or smaller so as to allow for attachment in this desired region. However, the profile may be larger for certain vehicles and may only be limited by the dimensions of the particular vehicle's wheel well region. The depth of the device may be between about 25 mm and about 60 mm, depending on the space available in the vehicle.

In a more particular example of a vehicle according to a preferred embodiment, the vehicle may comprise a foot well configured to receive a vehicle occupant's legs. The foot well may be defined at least in part by a firewall. One or more sensors configured to detect an impact event within the vehicle may be provided. In some embodiments, the sensor(s) may be particularly configured to detect a foot well intruding impact and differentiate between such an impact and an impact event not resulting in, or unlikely to result in, intrusion into the foot well.

The vehicle may comprise a wheel well structure defining a wheel well configured to accommodate a vehicle wheel. The wheel well structure may comprise a wheel well frame defined by a portion of a vehicle body and a wheel well shroud positioned adjacent to the wheel well frame such that a wheel well pocket is defined between the wheel well frame and the wheel well shroud. The vehicle may further comprise an expandable structure positioned in the wheel well pocket. The expandable structure may be configured to receive a signal from the at least one sensor and, in response to receipt of the signal, actuate the expandable structure from a first, contracted configuration to a second, expanded configuration. The expandable structure may be further configured to deflect the vehicle wheel away from the foot well during the impact event to reduce the chances of the vehicle wheel entering the foot well during the impact event. In some embodiments, the expandable structure may be positioned and configured to deflect the vehicle wheel to the side of the vehicle body, rather than towards the front of the vehicle.

In some embodiments, the expandable structure may comprise at least one folded section comprising at least one pleat. The at least one folded section may be configured such that the at least one pleat at least partially unfolds when the expandable structure expands from the first configuration to the second configuration.

In some embodiments, the expandable structure may further comprise a first panel comprising a sheet of metal and a second panel comprising a sheet of metal coupled with the first panel such that a first folded section couples the first panel with the second panel at a first end of the expandable structure and such that a second folded section couples the first panel with the second panel at a second end opposite from the first end. The first panel and/or the second panel may comprise one curve, or a compound curve, configured to at least substantially match a curvature of the wheel well frame.

In another particular example of a vehicle according to a preferred embodiment, the vehicle may comprise a wheel well structure defining a wheel well configured to accommodate a vehicle wheel, at least one sensor configured to detect a foot well intruding impact event, and an expandable structure for deflecting a vehicle wheel during the impact event.

The expandable structure may at least partially define an inflatable chamber, wherein the expandable structure is positioned adjacent to the wheel well structure, and may be configured to receive a signal from the at least one sensor indicating the occurrence of a foot well intruding impact event, and, in response to receipt of the signal, actuate the expandable structure from a first, contracted configuration to a second, expanded configuration. The expandable structure may be positioned and configured such that the inflatable chamber of the expandable structure is partially defined by the wheel well structure of the vehicle in the second configuration.

In some embodiments, the expandable structure may comprise at least one folded section comprising at least one pleat. The at least one folded section may be configured such that the at least one pleat at least partially unfolds when the expandable structure expands from the first configuration to the second configuration. In some such embodiments, the expandable structure may comprise a plurality of folded sections.

In some embodiments, the expandable structure may comprise a bellows cavity comprising a plurality of pleats. The bellows cavity may be configured to expand and unfold as the expandable structure expands from the first configuration to the second configuration.

In some embodiments, the expandable structure may comprise a molded bellows cavity. For example, some embodiments may comprise at least one of a molded thermoplastic material and a rigid, rubber material. Some embodiments may comprise a composite rubber material comprising cords, wires, and/or other reinforcing pieces encased in the rubber material similar to many vehicle tires.

In some embodiments, the expandable structure may comprise a bellows portion defining the bellows cavity and a mounting structure configured to facilitate coupling the bellows portion with a wheel well structure or other portion of a vehicle. In some embodiments, the mounting structure may comprise an annulus. The annulus may be configured such that the mounting structure may be coupled with the bellows portion along the annulus. In some embodiments, the mounting structure may further comprise a lip extending about the annulus, and the bellows portion may comprise an annular portion. The lip may engage the annular portion to secure the bellows portion to the mounting structure.

In a particular example of a system for deflecting a vehicle wheel during an impact event according to another embodiment, the system may comprise an expandable structure comprising a rigid material, such as a metal, metal composite, rigid thermoplastic material, or rigid rubber or rubber composite. The expandable structure may be configured to be positioned in a wheel well of a vehicle. The expandable structure may be further configured to actuate from a first, contracted configuration to a second, expanded configuration, and to deflect a vehicle wheel away from a foot well of the vehicle during an impact event to reduce the chances of the vehicle wheel entering the foot well during the impact event.

The system may further comprise an inflator configured to deliver a fluid, such as a gas, to the expandable structure during actuation so as to expand the expandable structure from the first configuration to the second configuration.

Some embodiments may further comprise a sensor, or multiple sensors, that may be configured to detect an impact event. The expandable structure may be configured to receive a signal from the sensor and, in response to receipt of the signal, actuate the expandable structure from the first configuration to the second configuration. In embodiments comprising multiples sensors, the system may be configured to determine whether an impact event is a foot well intruding impact event by comparing signals from the sensor and the second sensor.

In some embodiments, the expandable structure may comprise a tubular structure comprising at least one folded section, each of which comprises at least one pleat. The at least one folded section may be configured such that the at least one pleat at least partially unfolds when the expandable structure expands from the first configuration to the second configuration.

In some embodiments, the expandable structure may be configured such that an inflatable chamber of the expandable structure is at least partially defined by a wheel well structure of the vehicle in the second configuration.

In some embodiments, the expandable structure may comprise a bellows cavity comprising a plurality of pleats, wherein the bellows cavity is configured to expand and unfold as the expandable structure expands from the first configuration to the second configuration. In some such embodiments, the expandable structure may comprise a bellows portion defining the bellows cavity and a mounting structure comprising an annulus. In some embodiments, the annulus may comprise a metal material. The mounting structure may be configured to be coupled with a wheel well structure of the vehicle, and the mounting structure may be configured to be coupled with the bellows portion along the annulus.

The mounting structure may further comprise a lip extending about the annulus. The bellows portion may comprise an annular portion, and the lip may be configured to engage the annular portion to secure the bellows portion to the mounting structure.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 9 is a rear perspective view of the embodiment of FIGS. 7 and 8.

FIG. 10 is a cross-sectional view taken along line 10 - 10 in FIG. 9.

FIG. 11 is a cross-sectional view taken along line 11 - 11 in FIG. 9.

FIG. 12 is a front perspective view of yet another embodiment of an expandable structure for deflecting a vehicle wheel coupled with a vehicle wheel well structure.

FIG. 13 is a cross-sectional view taken along line 13 - 13 in FIG. 12.

FIG. 14 is a cross-sectional view taken along line 14 - 14 in FIG. 12.

FIG. 15 is a partial perspective view of a foot well of a vehicle incorporating an expandable structure for deflecting a vehicle wheel according to FIGS. 12-14.

FIG. 16 is a front perspective view of still another embodiment of an expandable structure for deflecting a vehicle wheel coupled with a vehicle wheel well structure.

FIG. 17 is a cross-sectional view taken along line 17 - 17 in FIG. 16.

FIG. 18 is a cross-sectional view taken along line 18 - 18 in FIG. 16.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Embodiments of the systems, apparatus, and methods disclosed herein relate to deflecting vehicle wheels and other vehicle structures away from a foot well of a vehicle during certain impact events, such as foot well intruding impact events.

In some preferred embodiments, the system may comprise an expandable structure, such as an inflatable structure, which may be located in the wheel well of the vehicle. During a crash, the expandable structure may be configured to inflate or otherwise expand to provide increased stiffness in this area of the vehicle and/or to fill the gap between the wheel and frame. The expandable structure may comprise a stiff, non-flexible structure so as to provide sufficient deflecting force to deflect an intruding wheel away from the occupant's foot well or cabin area.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1:
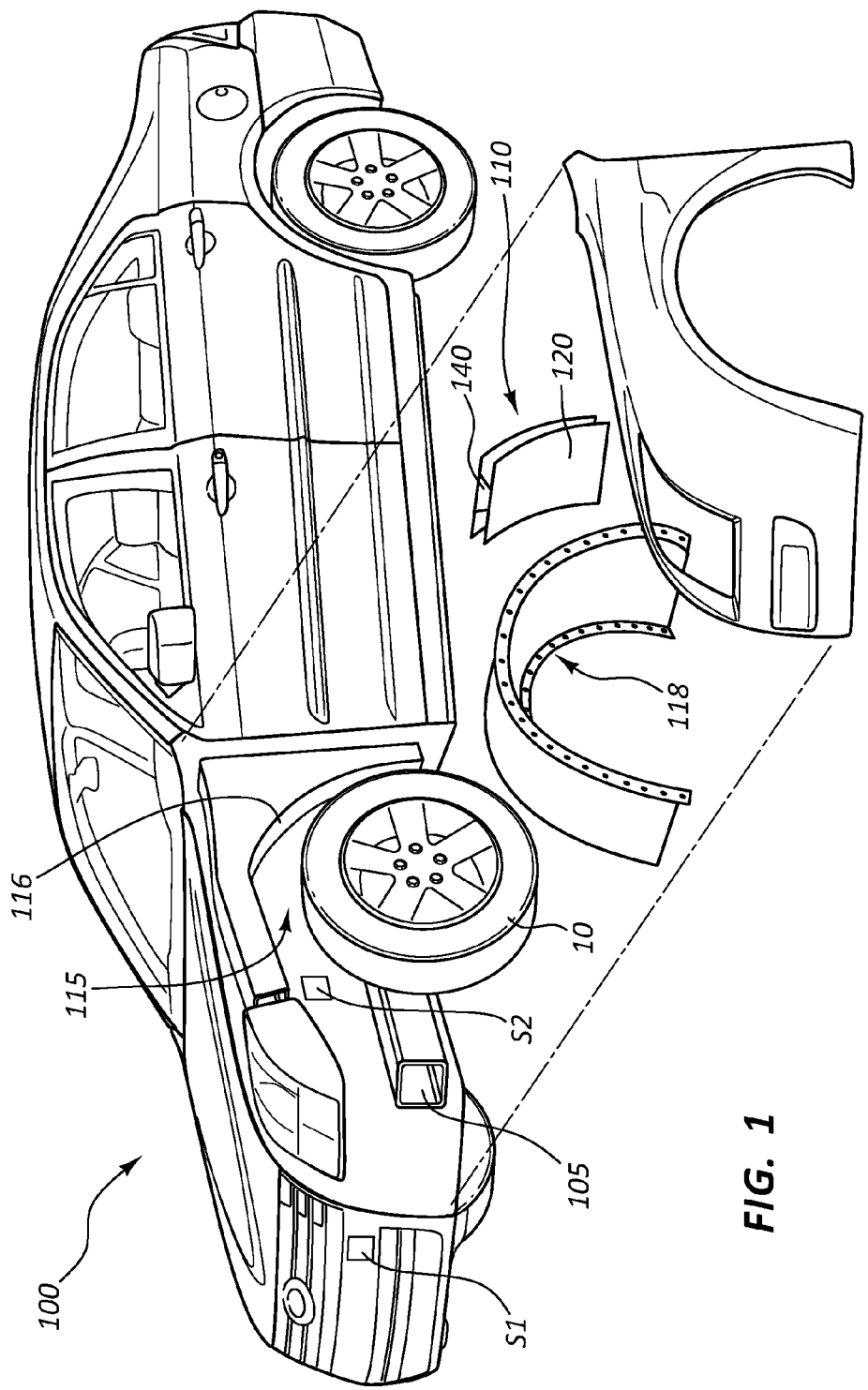
FIG. 1 depicts a vehicle including an expandable structure for deflecting a vehicle wheel according to one embodiment positioned in the wheel well.

FIG. 1 depicts a vehicle 100 including a system 110 for deflecting a vehicle wheel during an impact event according to one embodiment. Vehicle 100 may comprise one or more sensors, one or more of which may be part of seat displacement system 110. For example, vehicle 100 comprises sensors S1 and S2, one or both of which may be part of system 110. Sensor S1 may be positioned somewhere in the front of vehicle 100, such as in or adjacent to the bumper, for example. Sensor S2 may be positioned on a side of vehicle 100 so as to be positioned outside of the vehicle's longitudinal structure 105. For example, in some embodiments, sensor S2 may be positioned adjacent to a firewall of vehicle 100 or may be positioned on a side portion of a front bumper of vehicle 100.

Sensors S1 and/or S2 may be configured to detect an impact event, such as a collision with another automobile and/or a stationary object. In some embodiments, one or more of the sensors may be configured to detect, in particular, a foot well intruding impact event. A foot well intruding impact event may be an impact event that is determined as being likely to result in intrusion into the foot well of the vehicle 100 (such as by a wheel of the vehicle 100) and/or may be an impact event that is confirmed as resulting in such intrusion.

Thus, one or more of the sensors may be configured to determine whether an impact event is a foot well intruding impact event. In some embodiments, this may be determined by comparing the results of one or more sensors with the results of one or more other sensors. For example, if each of the sensors positioned along a front portion of a vehicle indicate detection of an impact, it may be less likely to result in intrusion into the vehicle than if only one or more sensors positioned on one particular side of the vehicle indicate detection of an impact.

With respect to the embodiment depicted in FIG. 1, sensor S2, because of its positioning outside of sensor S2, may be used alone to determine whether an impact event is a foot well intruding impact event. Alternatively, sensor S1 (and/or other similar sensors) may be used in combination with sensor S2 (and/or other similar sensors) to make this determination.

System 110 may comprise an expandable structure 120 that may be configured to inflate or otherwise expand upon deployment to provide a deflecting force to decrease the chances that wheel 10 of vehicle 100 will intrude into a foot well and/or cabin area of the vehicle 100. Although the embodiment of FIG. 1 is shown as being incorporated into a driver's side of the vehicle 100, other embodiments may comprise a similar expandable structure on the passenger side of vehicle 100.

Expandable structure 120 may be positioned within or near a wheel well structure defining a wheel well 115 configured to accommodate a vehicle wheel 10. This wheel well structure may comprise a wheel well frame 116 defined by a portion of a vehicle body of vehicle 100 and a wheel well shroud 118 positioned adjacent to the wheel well frame 116 such that a wheel well pocket is defined between the wheel well frame 116 and the wheel well shroud 118. In other embodiments, however, the expandable structure 120 may be positioned at other suitable locations in vehicle 100, such as outside of wheel well shroud 118, within a pre-defined structure in vehicle 100, or in a foot well of vehicle 100.

Preferably, expandable structure 120 comprises a rigid material with sufficient strength and rigidity upon deployment to withstand the forces of an incoming vehicle wheel during a collision. Thus, most materials typically used for occupant airbags are unlikely to be suitable for use in forming expandable structure 120. Examples of suitable materials include metals, such as ASTM A1008 CS Type B sheet or another high-strength steel-alloy sheet with suitable formability. Another higher strength optional material that may be used is ASTM A709 which is a grade 50 steel, which is also available in sheet form. In some embodiments, a stiff rubber material or rubber composite may be used. In some such embodiments, cords and/or wires may be encased in the rubber material similar to many vehicle tires.

Figure 2:
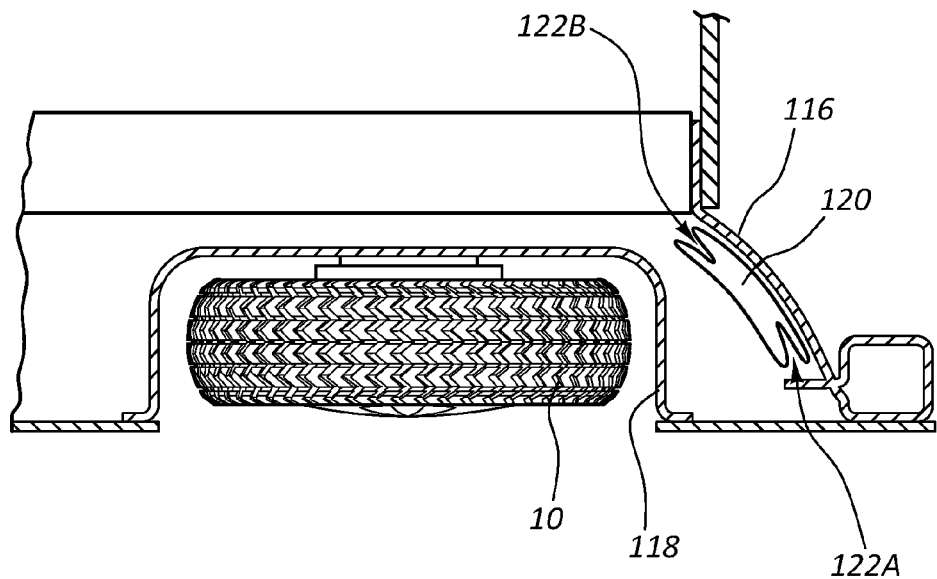
FIG. 2 is a cross-sectional view depicting the expandable structure for deflecting a vehicle wheel of FIG. 1 prior to deployment.
Figure 3:
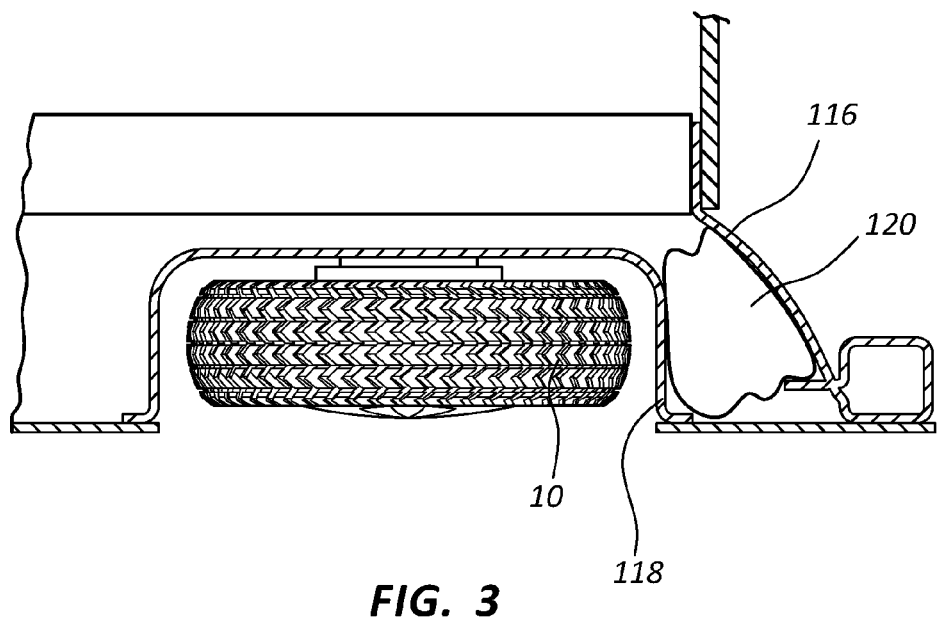
FIG. 3 is a cross-sectional view of the embodiment of FIG. 2 shown after deployment of the expandable structure.

Upon receiving an indication from one or more sensors, such as sensors S1 and/or S2, of a foot well intruding impact event, system 110 may be configured to actuate an inflator 140, which may be configured to inflate or otherwise expand structure 120. As shown in the cross-sectional views of FIGS. 2 and 3, expandable structure 120 comprises two folded sections, namely, folded sections 122A and 122B, each of which comprises at least one pleat. As the expandable structure 120 expands from a first, contracted configuration (FIG. 2) to a second, expanded configuration (FIG. 3), folded sections 122A and 122B unfold to allow for this expansion. More generally, upon deployment, expandable structure 120 expands within the wheel well pocket defined between the wheel well frame 116 and the wheel well shroud 118 to provide a rigid structure for deflecting wheel 10 during an impact event.

Figure 4:
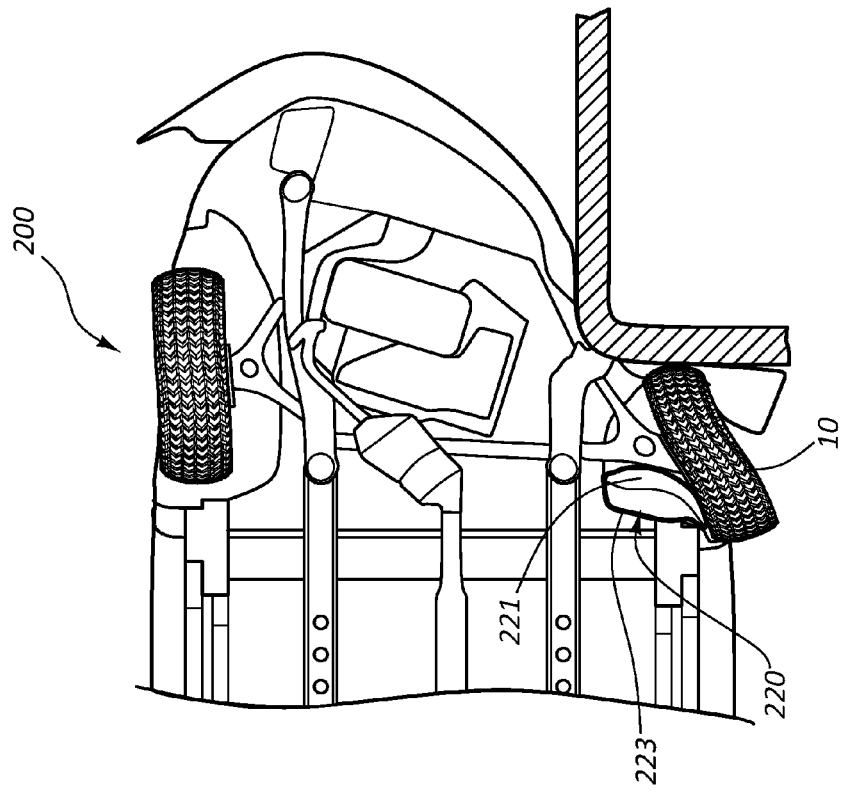
FIG. 4 depicts the front undercarriage of a vehicle including another embodiment of an expandable structure for deflecting a vehicle wheel during a foot well intruding impact event.
Figure 5:
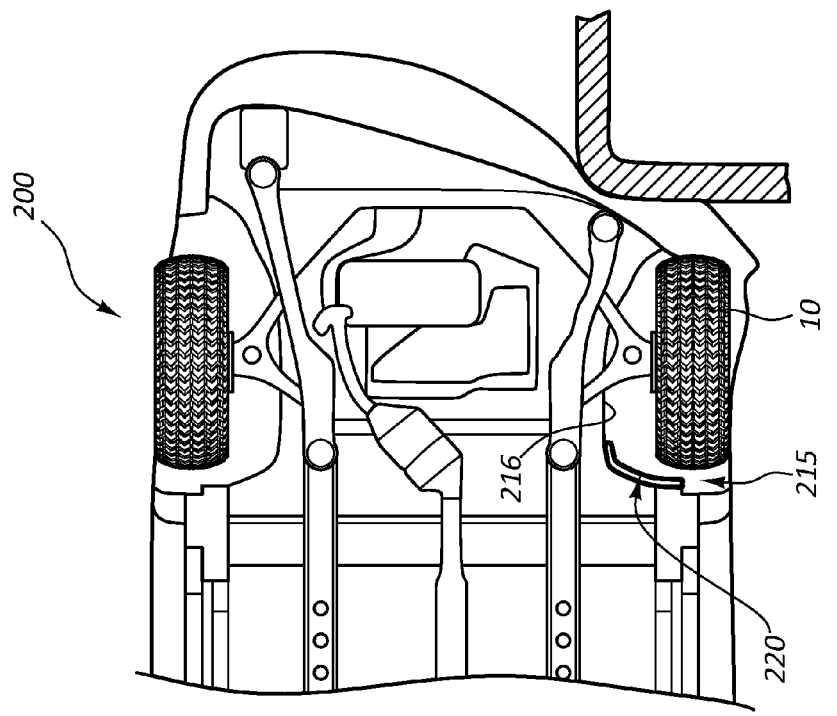
FIG. 5 depicts the embodiment of FIG. 4 following deployment of the expandable structure during the impact event.

FIGS. 4 and 5 depict the front undercarriage of a vehicle 200 including another embodiment of an expandable structure 220 for deflecting a vehicle wheel 10 during a foot well intruding impact event. In these figures, FIG. 4 depicts the vehicle 200 at the beginning of such an impact and FIG. 5 depicts the vehicle 200 following deployment of the expandable structure 220.

As shown in FIG. 4, expandable structure 220 may be positioned within wheel well 215 of vehicle 200. More particularly, expandable structure 220 may be particularly positioned and configured to provide a deflecting force designed to pivot a rear portion of wheel 10 away from vehicle 200, and away from a foot well or cabin (not shown) of vehicle 200. This may be accomplished by, for example, putting expandable structure 220 at least partially along a corner of a wheel well structure 216 defining wheel well 215 such that the force generated during deployment of expandable structure 220 is at least partially directed to the side of vehicle 200, rather than towards the front of vehicle 200.

As best seen in FIG. 5, in some embodiments, expandable structure 220 may comprise an interior portion, such as a bladder 221 and an exterior portion, such as a shell 223. Shell 223 may comprise a harder and/or tougher material that may be better suited to withstand impacts with wheel 10 and/or other structures during an impact event. In some embodiments, shell 223 may comprise, for example, thermoplastic elastomers (TPE), preferably with high strain-to-strength characteristics, such as styrenic block copolymers, polyolefin blends (TPOS), elastomeric alloys, thermoplastic polyurethanes (TPUS,) thermoplastic copolyesters, or thermoplastic polyamides, which are preferably soft enough to expand, but strong enough to withstand impacts from the intruding wheel structure. Other possible materials may include thermoset rubbers, such as nitrile rubber (NBR), ethylene propylene (EPR), or fluorocarbon elastomers (FKM). Still other suitable materials for certain embodiments may include vulcanized rubber, polyisoprene (natural rubber), or styrene-butadiene rubber (SBR) which are often used for passenger car tires.

Bladder 221 may comprise a more flexible material that may be used to provide sufficient force to expand shell 223, but not necessarily the rigidity and/or strength needed to withstand the forces of a vehicle crash alone. Bladder 221 may comprise, for example, one or more of the materials listed above, but preferably formulated so as to have a lower durometer number in order to achieve a more flexible material. Other more flexible materials may be used if desired.

Figure 6:
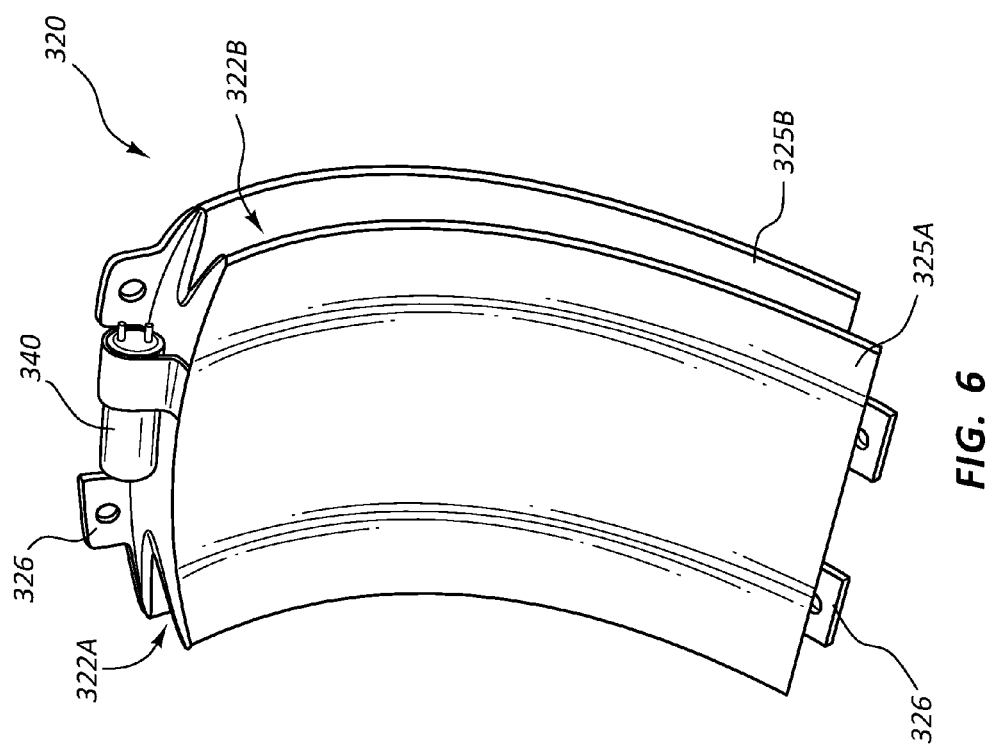
FIG. 6 is a perspective view of another embodiment of an expandable structure for deflecting a vehicle wheel.

FIG. 6 is a perspective view of another embodiment of an expandable structure 320 for deflecting a vehicle wheel during an impact event, such as a foot well intruding impact event. Expandable structure 320 comprises a first panel 325A and a second panel 325B positioned opposite the first panel 325A. Panels 325A and 325B may comprise, for example, sheet metal or another metal or other relatively rigid material. Other examples of suitable materials include ASTM A572 steel grade 50 or another preferably high-strength, low-alloy structural steel with high elongation, or ASTM AS70/AS7OM rolled sheets of carbon structural steel, preferably with grades of G30 to G55 and elongations of 21% to 9% for formability. Panels 325A and 325B are preferably both configured with at least one curve so as to at least substantially match a curvature of a wheel well frame of a vehicle (not shown in FIG. 6). In some embodiments, panels 325A and/or 325B may comprise a compound curve comprising at least two such curves. Such embodiments may be particularly useful for certain wheel well structures comprising one curvature for wheel circumference and another for a turning radius of the vehicle wheel.

Expandable structure 320 further comprises two folded sections, namely, folded sections 322A and 322B. Folded sections 322A and 322B each comprise a pleat. Although only a single pleat or fold is shown in the figure, other embodiments are contemplated in which a plurality of pleats may be formed in one or both of folded sections 322A and 322B. Folded sections 322A and 322B are configured such that these pleats at least partially unfold when the expandable structure 320 expands from a first, contracted configuration to a second, expanded configuration.

In some embodiments, expandable structure 320 may be formed using a tubular structure by folding one or more pleats on opposing sides of the tubular structure. The tubular structure may then be flatted on opposing sides to form panels 325A and 325B, after which top and bottom portions of the device may be welded together to create a substantially airtight pressure vessel. Alternatively, additional pieces of material may be used to form top and/or bottom panels to enclose the device.

One or more coupling flanges 326 may also be welded or otherwise coupled to expandable structure 320 which may facilitate coupling expandable structure 320 to an existing wheel well of a vehicle. An actuator 340, such as a pyrotechnic or hybrid inflator, may be coupled to the device. The inflator 340 may be configured to fill a chamber defined by the panels 325A and 325B with a gas or other fluid, thereby expanding the structure 320 from its first, flattened configuration to an expanded configuration to allow for deflecting a vehicle wheel during a foot well intruding impact event.

The depth and/or number of side pleats may be used to determine, and therefore fine tune, the desired expansion of expandable structure 320. In some preferred embodiments, the expanded depth may be between about 150 mm and about 200 mm so as to fill the gap between the wheel and wheel well, as determined by the vehicle design and geometry. In some embodiments, the expandable structure 320 may be configured to expand from its first, contracted configuration to its second, expanded configuration by a distance of between about 100 mm and about 200 mm.

Figure 7:
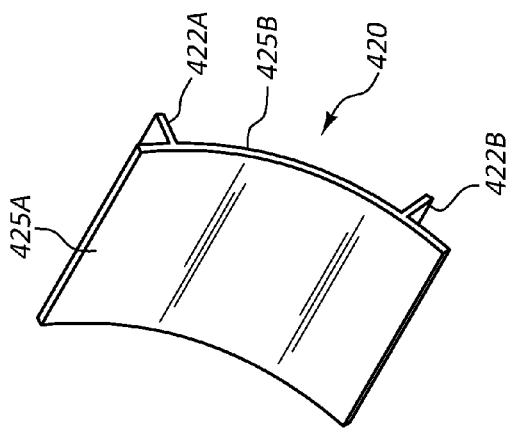
FIG. 7 is a front perspective view of still another embodiment of an expandable structure for deflecting a vehicle wheel.

FIG. 7 is a front perspective view of still another embodiment of an expandable structure 420 for deflecting a vehicle wheel. Expandable structure 420 comprises a folded, rigid, expandable structure 420 with opposing panels, one or both of which define one or more protruding folds. Expandable structure 420 may further comprise one or more separate accordion folds.

Figure 8:
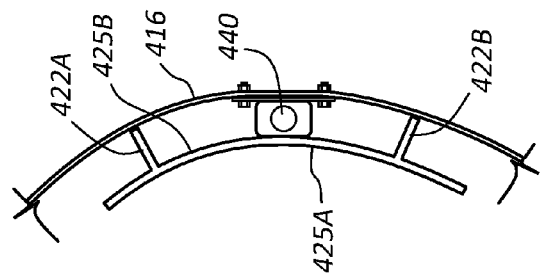
FIG. 8 is a side elevation view of the embodiment of FIG. 7.

More particularly, expandable structure 420 comprises a first panel 425A and a second panel 425B. As previously described, these panels may comprise a single curve, or multiple curves, in order to facilitate desired positioning within a wheel well of a vehicle. For example, as illustrated in FIG. 8, expandable structure 420 may curve so as to at least substantially match the curvature of wheel well frame 416.

A first folded section 422A extends from second panel 425B adjacent to a first end of second panel 425B and a second folded section 422B extends from second panel 425B adjacent to a second end of second panel 425B opposite from the first end. Folded sections 422A and 422B comprise protruding folded sections and may extend in a direction at least substantially perpendicular from second panel 425B.

An actuator, such as inflator 440, may be positioned adjacent to second panel 425B so as to be in position to inflate or otherwise expand expandable structure 420. Inflator 440 may be positioned within an inflator housing 445, which may be integrally formed with or otherwise attached to or coupled with second panel 425B.

As shown in FIG. 11, expandable structure 420 may further comprise one or more accordion folds 424 between first panel 425A and second panel 425B. In some embodiments, first and second accordion folds 424 may extend along an edge of expandable structure 420 from one side to another, opposite side. Thus, accordion fold 424 may, for example, extend along a side edge of expandable structure 420 between the top and bottom sides of the structure so as to intersect protruding folded sections 422A and 422B in at least substantially a perpendicular direction. During deployment of the inflator 440, the accordion fold(s) 424 and the protruding folds 422A and 422B may therefore unfold to form four substantially planar walls defining an inflation chamber. Additional details regarding the embodiment depicted in FIGS. 7-11 can be found in U.S. Patent No. 6,848,715, the entire contents of which are hereby incorporated herein by reference.

FIG. 12 is a front perspective view of yet another embodiment of an expandable structure 520 for deflecting a vehicle wheel. In some such embodiments, two separate curves, or a compound curve, may be built into the geometry of the device. In the depicted embodiment, a portion of a vehicle wheel well frame 516 may define one of two opposing panels of the structure. However, other embodiments are contemplated in which the expandable structure 520 may comprise two separate panels, or may otherwise be designed to define an inflation chamber without use of the vehicle wheel well frame 416.

For example, some embodiments may comprise two steel-stamped pieces. Preferably, the piece configured to face the vehicle wheel would have a plurality of folds 522 stamped or otherwise formed into the geometry of this piece, as shown in FIG. 14. The dimensions and number of these folds may be used to determine the amount of expansion that would take place during inflation. The second panel of this embodiment may be formed with one or more curves matching that of a wheel well structure, or may be the vehicle structure itself, as depicted in FIGS. 12-14.

The second or rear panel, whether the vehicle structure or an added structure coupled to the first panel, may comprise an inflation hole 517 to allow for an inflation housing 545 and/or accompanying inflator 540 to be mounted inside a vehicle. As shown in FIG. 15, in such embodiments, inflator housing 545 and/or inflator 540 may be positioned within a foot well of a vehicle defined by floor 15 and firewall 16.

The inflator housing 545 and/or inflator 540 may be welded to wheel well frame 516 (or a second panel). Alternatively, inflator housing 545 and/or inflator 540 may be coupled with expandable structure 520 using bolts or other fasters, as illustrated in FIG. 14. In some embodiments, expandable structure 520 may be mounted along a reinforced region of the vehicle, such as a region comprising stiffening ribs 519, in order to provide enhanced protection.

FIG. 16 a front perspective view of still another embodiment of an expandable structure 620 for deflecting a vehicle wheel. Expandable structure 620 comprises a bellows cavity comprising a plurality of pleats 622. The bellows cavity is configured to expand and unfold as the expandable structure expands from a first, contracted configuration to a second, expanded configuration. The bellows cavity is defined by pleats that extend around a circumference of expandable structure 620. In some embodiments, the bellows cavity may comprise a molded bellows cavity, which may be manufactured by, for example, blow-molding thermoplastic resins. Alternatively, the bellows cavity may comprise a rigid, rubber material or rubber composite, such as rubber materials used to form tires. In some such embodiments, cords and/or wires may be encased in the rubber material to provide reinforcement.

Expandable structure 620 may further comprise a mounting structure 630. Mounting structure 630 may comprise an annulus. Mounting structure 630 may be coupled with a wheel well structure 616 of a vehicle such that mounting structure 630 is coupled with a bellows portion of the structure along the annulus of the mounting structure 630.

Mounting structure 630 may further comprises a lip or rim 632 extending about the annulus. The bellows portion of mounting structure 630 may similarly comprise an annular portion such that the lip or rim 632 engages the annular portion to secure the bellows portion to the mounting structure 630.

As with other embodiments, an inflator 640 within an inflator housing 645 may be provided. Inflator 640 and/or inflator housing 645 may, as shown in FIG. 17, be mounted inside the vehicle on an inner surface of wheel well frame 616, which may be useful to keep inflator 640 out of the elements (debris and moisture, e.g.) of the wheel cavity. Alternatively, inflator 640 and/or inflator housing 645 may be mounted inside an inflation chamber defined by expandable structure 620.

In embodiments using a gas inflator, the pressure inside the inflation chamber is preferably much higher than a similar pressure within the vehicle's tires. For example, in preferred embodiments, this air pressure is at least 1.5 times the vehicle's tire pressure.

The embodiment depicted in FIGS. 16-18 may be preferred for some implementations because it may be easier to mold a compound curve into the expandable structure 620 to better conform with the shape of a vehicle wheel well structure 616. In some embodiments, the bellows portion of the expandable structure 620 may be configured to snap fit into the mounting structure 630 so as to form an air- tight seal similar to the manner in which a vehicle tire is mounted to a wheel rim. In some embodiments, lip 632 may comprise an L-shaped lip to further facilitate this coupling. In some embodiments, a sealing cement or gasket paste may be installed in the joint between the bellows portion and the lip 632 to further facilitate an air-tight seal. The mounting structure 630 may be bolted, welded, or otherwise coupled to the vehicle's wheel well structure 616.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle, comprising:
a foot well configured to receive a vehicle occupant's legs, wherein the foot well is defined at least in part by a firewall;
at least one sensor configured to detect an impact event within the vehicle;
a wheel well structure defining a wheel well configured to accommodate a vehicle wheel, wherein the wheel well structure comprises:
a wheel well frame defined by a portion of a vehicle body; and
a wheel well shroud positioned adjacent to the wheel well frame such that a wheel well pocket is defined between the wheel well frame and the wheel well shroud; and
an expandable structure positioned in the wheel well pocket, wherein the expandable structure is configured to receive a signal from the at least one sensor and, in response to receipt of the signal, actuate the expandable structure from a first, contracted configuration to a second, expanded configuration, and wherein the expandable structure is configured to deflect the vehicle wheel away from the foot well during the impact event to reduce the chances of the vehicle wheel entering the foot well during the impact event.

2. The vehicle of claim 1, wherein the expandable structure comprises at least one folded section comprising at least one pleat, and wherein the at least one folded section is configured such that the at least one pleat at least partially unfolds when the expandable structure expands from the first configuration to the second configuration.

3. The vehicle of claim 2, wherein the expandable structure further comprises:
a first panel comprising a sheet of metal; and
a second panel comprising a sheet of metal coupled with the first panel such that a first folded section couples the first panel with the second panel at a first end of the expandable structure and such that a second folded section couples the first panel with the second panel at a second end opposite from the first end.

4. The vehicle of claim 3, wherein the first panel and the second panel both comprise at least one curve configured to at least substantially match a curvature of the wheel well frame.

5. The vehicle of claim 1, wherein the impact event comprises a foot well intruding impact event, and wherein the at least one sensor is configured to determine whether the impact event is a foot well intruding impact event.

6. A vehicle, comprising:
a wheel well structure defining a wheel well configured to accommodate a vehicle wheel;
at least one sensor configured to detect a foot well intruding impact event;
and an expandable structure at least partially defining an inflatable chamber, wherein the expandable structure is positioned adjacent to the wheel well structure, wherein the expandable structure is configured to receive a signal from the at least one sensor indicating the occurrence of a foot well intruding impact event, and, in response to receipt of the signal, actuate the expandable structure from a first, contracted configuration to a second, expanded configuration, and wherein the expandable structure is positioned and configured such that the inflatable chamber of the expandable structure is partially defined by the wheel well structure of the vehicle in the second configuration.

7. The vehicle of claim 6, wherein the expandable structure comprises at least one folded section comprising at least one pleat, and wherein the at least one folded section is configured such that the at least one pleat at least partially unfolds when the expandable structure expands from the first configuration to the second configuration.

8. The vehicle of claim 7, wherein the expandable structure comprises a plurality of folded sections.

9. The vehicle of claim 6, wherein the expandable structure comprises a bellows cavity comprising a plurality of pleats, and wherein the bellows cavity is configured to expand and unfold as the expandable structure expands from the first configuration to the second configuration.

10. The vehicle of claim 9, wherein the expandable structure comprises a molded bellows cavity.

11. The vehicle of claim 9, wherein the expandable structure comprises:
a bellows portion defining the bellows cavity; and
a mounting structure comprising an annulus, wherein the mounting structure is coupled with the wheel well structure, and wherein the mounting structure is coupled with the bellows portion along the annulus.

12. The vehicle of claim 11, wherein the mounting structure further comprises a lip extending about the annulus, wherein the bellows portion comprises an annular portion, and wherein the lip engages the annular portion to secure the bellows portion to the mounting structure.

13. A system for deflecting a vehicle wheel during an impact event, comprising:
an expandable structure comprising a rigid material, wherein the expandable structure is configured to be positioned in a wheel well of a vehicle, wherein the expandable structure is further configured to actuate from a first, contracted configuration to a second, expanded configuration, and wherein the expandable structure is configured to deflect a vehicle wheel away from a foot well of the vehicle during an impact event to reduce the chances of the vehicle wheel entering the foot well during the impact event; and
an inflator configured to deliver a fluid to the expandable structure during actuation so as to expand the expandable structure from the first configuration to the second configuration.

14. The system of claim 13, further comprising a sensor configured to detect an impact event, wherein the expandable structure is configured to receive a signal from the sensor and, in response to receipt of the signal, actuate the expandable structure from the first configuration to the second configuration.

15. The system of claim 14, further comprising a second sensor configured to detect an impact event within the vehicle, and wherein the system is configured to determine whether an impact event is a foot well intruding impact event by comparing signals from the sensor and the second sensor.

16. The system of claim 13, wherein the rigid material comprises a metal material.

17. The system of claim 16, wherein the expandable structure comprises a tubular structure comprising at least one folded section, the at least one folded section comprising at least one pleat, and wherein the at least one folded section is configured such that the at least one pleat at least partially unfolds when the expandable structure expands from the first configuration to the second configuration.

18. The system of claim 13, wherein the fluid comprises a gas.

19. The system of claim 13, wherein the expandable structure is configured such that an inflatable chamber of the expandable structure is partially defined by a wheel well structure of the vehicle in the second configuration.

20. The system of claim 13, wherein the expandable structure comprises a bellows cavity comprising a plurality of pleats, and wherein the bellows cavity is configured to expand and unfold as the expandable structure expands from the first configuration to the second configuration.

21. The system of claim 20, wherein the expandable structure comprises a molded bellows cavity comprising at least one of a thermoplastic material and a rubber material.

22. The system of claim 21, wherein the expandable structure comprises:
   a bellows portion defining the bellows cavity; and
   a mounting structure comprising an annulus, wherein the annulus comprises a metal material, wherein the mounting structure is configured to be coupled with a wheel well structure of the vehicle, and wherein the mounting structure is configured to be coupled with the bellows portion along the annulus.

23. The system of claim 22, wherein the mounting structure further comprises a lip extending about the annulus, wherein the bellows portion comprises an annular portion, and wherein the lip is configured to engage the annular portion to secure the bellows portion to the mounting structure.

* * * * *